No. 618,398. Patented Jan. 31, 1899.
F. W. DARLINGTON.
FOUNTAIN.
(Application filed Oct. 11, 1897.)
(No Model.) 3 Sheets—Sheet 1.
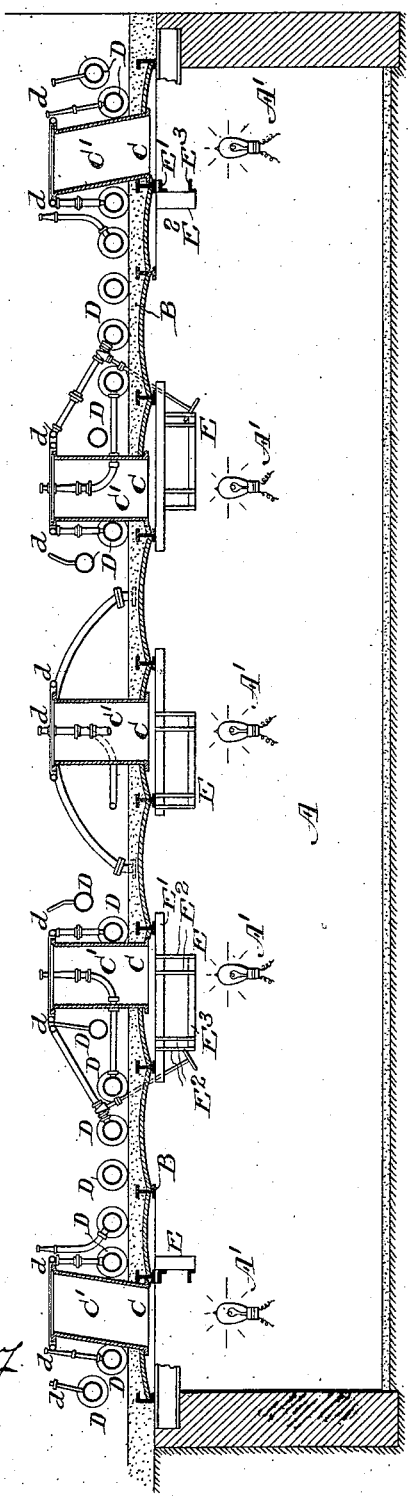
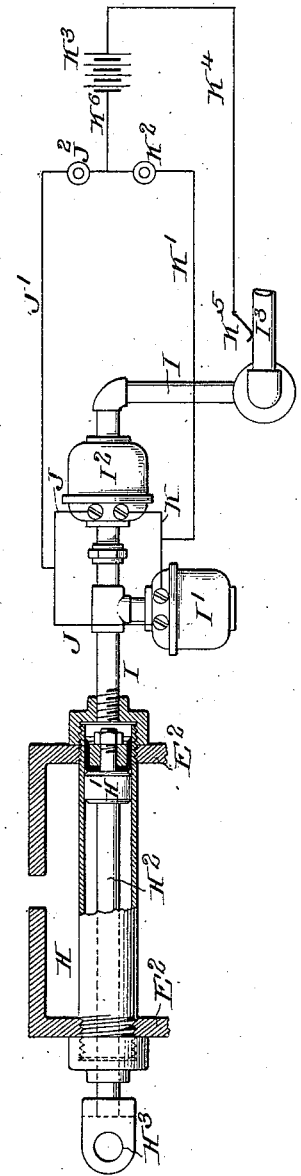
Witnesses. Inventor.
Frederic W. Darlington
Attorney.

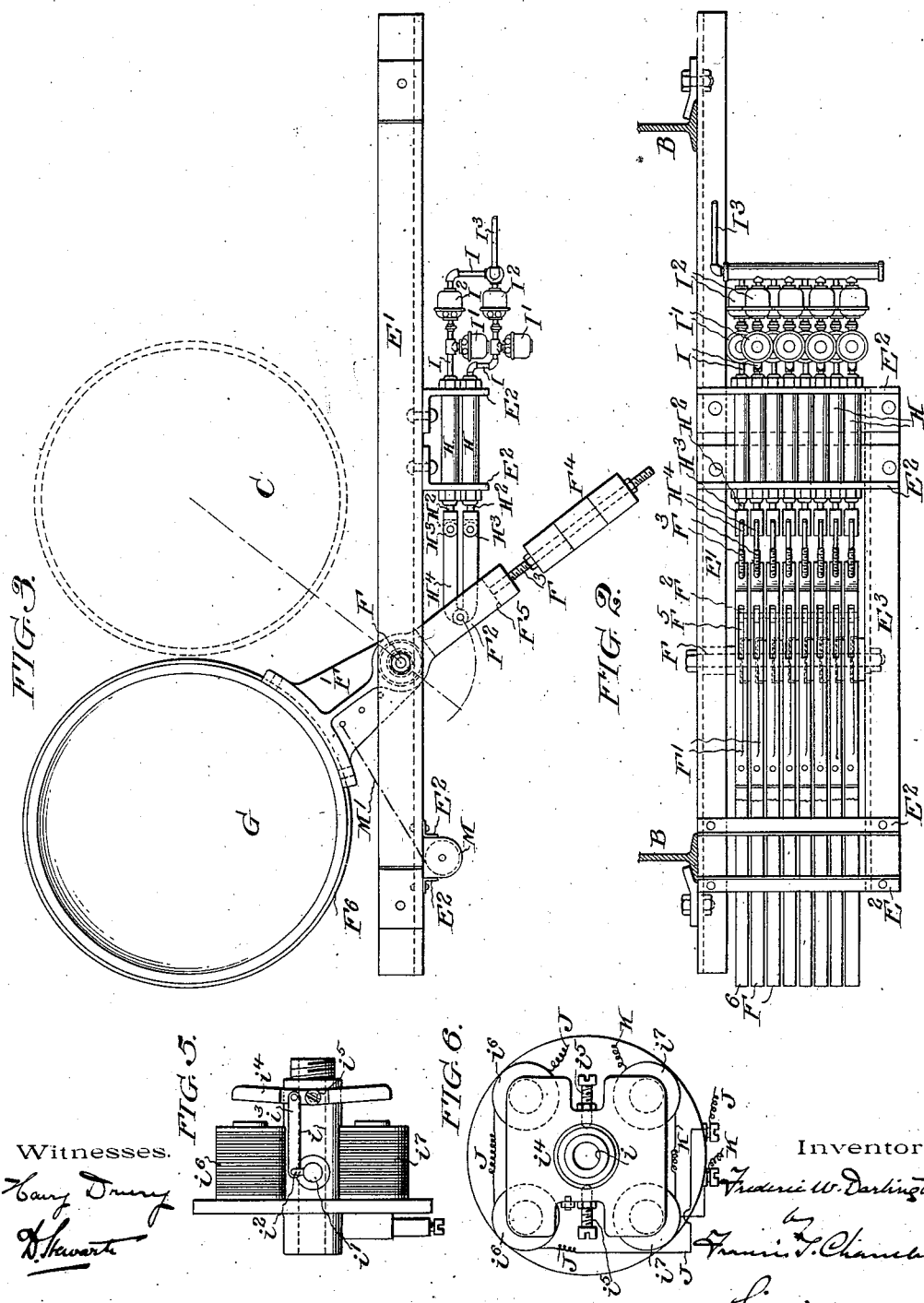

No. 618,398. Patented Jan. 31, 1899.
F. W. DARLINGTON.
FOUNTAIN.
(Application filed Oct. 11, 1897.)
(No Model.) 3 Sheets—Sheet 3.
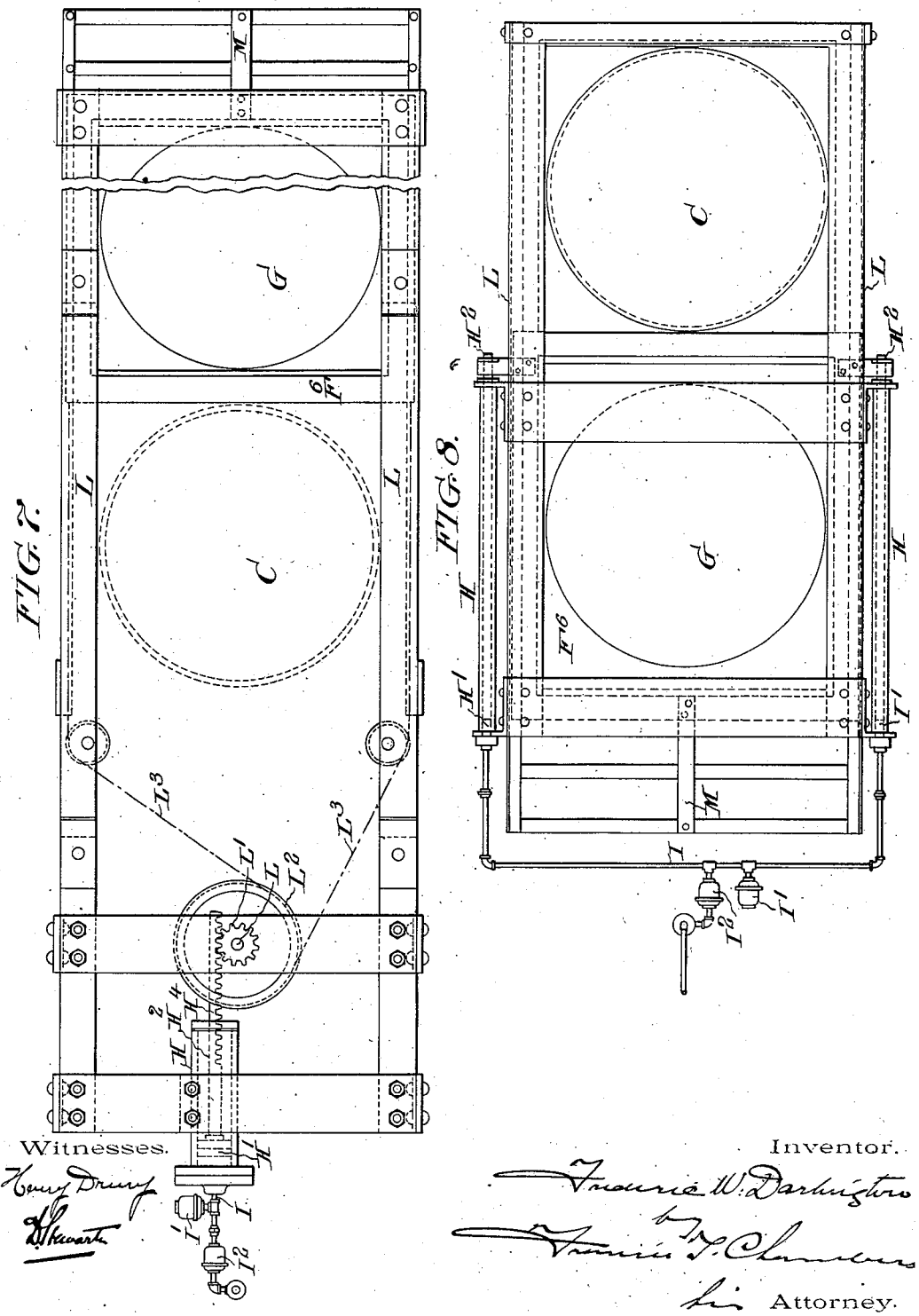
Witnesses. Inventor.

UNITED STATES PATENT OFFICE.

FREDERIC W. DARLINGTON, OF PHILADELPHIA, PENNSYLVANIA.

FOUNTAIN.

SPECIFICATION forming part of Letters Patent No. 618,398, dated January 31, 1899.

Application filed October 11, 1897. Serial No. 654,744. (No model.)

*To all whom it may concern:*

Be it known that I, FREDERIC W. DARLINGTON, a citizen of the United States of America, residing in the city and county of Philadelphia, in the State of Pennsylvania, have invented certain new and useful Improvements in Fountains, of which the following is a true and exact description, reference being had to the accompanying drawings, which form a part thereof.

My invention relates to the class of fountains generally known as "electrical" fountains—that is to say, fountains in which, in addition to the water-spraying mechanism, provision is made for the projection of light-rays, generally generated by arc-lights, into and through the water.

The object of my invention is to provide simple and efficient means for rapidly changing the color of the light of the various rays projected into the spray of the fountain, and the nature of my improvements will be best understood as described in connection with the drawings in which they are illustrated, and in which—

Figure 1 is a cross-sectional elevation of a fountain embodying some of my improved features of construction and of the kind to which all features of my invention are applicable. Fig. 2 is a side elevation of the mechanism for supporting and actuating the colored glass plates through which the light-ray is projected. Fig. 3 is a plan view of the mechanism shown in Fig. 2. Fig. 4 is a plan view, on an enlarged scale and partly in section, of an actuating-cylinder and its connected mechanism for operating one of the glass plates. Fig. 5 is a side elevation, and Fig. 6 a plan view, of one of the valves used in connection with the actuating-cylinders; and Figs. 7 and 8 are respectively plan views of alternative forms of plate-actuating mechanism.

A indicates the pit or chamber formed beneath the fountain, B being the roof of the pit or cave; C C, &c., openings formed through the roof for the passage of light rays, C' C', &c., being tubular extensions of the openings C, and A' indicating-lights situated in the pit or cave in proper relation to the opening C.

D D D, &c., are the water-distribution pipes of the fountain, $d$ $d$, &c., being the jets supplied by these distribution-pipes.

E E, &c., indicate framings for supporting the colored plates of glass or other transparent material, which are interposed between the lights A' and the hole C in order to color the rays. Preferably these frames are supported entirely from the roof B of the cave, so as to leave the body of the cave free. As shown, the frames are made up of angle-iron E', secured to the top of the roof and from which depend other angle-irons $E^2$ $E^2$, supporting the lower cross-bar $E^3$.

F indicates a shaft extending between the plates or bars E' and $E^3$ and upon which are pivotally supported the series of levers F' F', &c., carrying at one end the frame $F^6$, in which the glass plates G are held, and having on the other side of the pivoted shaft F extensions $F^2$, to which counterweights are attached to balance the weight of the glass and frame on the other end of the lever. As shown, a threaded rod $F^3$ extends out from the end of the arm $F^2$ and supports adjustable counterweights $F^4$. As shown, also, the arm $F^2$ is slotted at $F^5$ to receive the actuating connecting-rod $H^4$ pertaining to each particular lever.

H H, &c., are actuating-cylinders which, as shown in Figs. 2 and 3, are supported between one pair of angle-irons $E^2$ $E^2$.

H' (see Fig. 4) is a piston working in the cylinder H and connected with a piston-rod $H^2$, having at its end a head $H^3$, to which the connecting-rod $H^4$ is attached.

$I^3$ is a conduit leading from a source of fluid-pressure and connecting through branch conduits I with each of the cylinders H.

As shown in Fig. 4, I' is a valve controlling an exhaust-port from the conduit I. The particular kind of valve shown in the drawings is illustrated in detail in Figs. 5 and 6, in which $i$ indicates the passage for fluid, in which is situated a cock-valve, (indicated at $i'$,) this valve being controlled by lever extension $i^2$ and a connecting-rod $i^3$, connected with a pivoted armature-plate $i^4$, $i^5$ $i^5$ indicating the pivots upon which the plate $i^4$ turns and $i^6$ $i^6$ and $i^7$ $i^7$ electromagnets arranged in pairs, one pair on each side of the plate $i^4$, the arrangement being such that when the electromagnets $i^6$ are energized they turn the valve $i'$ downward and close it, while when the electromagnets $i^7$ are energized they turn the valve $i'$ upward and open it. The electrical connections to the magnets are illustrated in Figs. 6 and 4. In Fig. 6 it will be seen that a current entering through the wire J will energize the magnets $i^6$, while a current entering through the wire K will energize the magnets $i^7$, and in Fig. 4 it will be seen how the connections J and K may be led to two valves and be coupled by wires J' and K', each having a switch, as J² and K², with a wire K⁶ connecting with the battery or other electrical generator K³, the return circuit being through a wire K⁴ and contact K⁵ to a metallic part, as pipe I³, in electrical connection with the wires J and K. Thus by pressing the button J² the valve I² is opened and the valve I' closed, while by pressing the button K² the valve I² is closed and the valve I' opened.

M M M, &c., indicate a series of springs, one for each lever F', connected thereto, as by a cord M', the action of the spring being to draw the lever to the position shown in Fig. 3, which will remove the glass G from beneath the opening C. The operator by opening the valve I² and closing the valve I' of any particular actuating-cylinder H forces the piston H' outward and through its connection with the arm F² of a lever F' tilts the glass G until it comes between the light-generator and the opening C. When a change in the color of the ray is desired, the operator closes the valve I² and opens the exhaust-valve I', whereupon the spring M will draw the glass G away from the opening C and force piston H' back to the position shown in Fig 4.

While I much prefer the device above described and by which each of the glasses is secured to an independent pivoted lever, excellent results can be obtained by the modifications of the mechanism shown in Figs. 7 and 8. Thus in Fig. 7 a series of glass frames F⁶ are arranged to slide in a frame L, spring M being connected with each sliding frame to draw it back away from the opening C; and cords L³ L³, winding on drums L², serve to draw the frames F⁶ forward until they cover the opening C. The drums L² are each pivoted on a shaft L and, as shown, are provided with gear-wheels L', with which engage toothed extensions H⁴ of the piston-rods H². In the other modification illustrated in Fig. 8 two actuating-cylinders H H are supplied for each sliding frame F⁶, and the frames are directly secured to the piston-rods H² at each end. In this modification a single inlet and exhaust valve are supplied for each pair of cylinders arrange to actuate a single glass-holding frame.

The particular mechanism shown and above described is well adapted for the purposes in view. I do not, however, wish to be understood as limiting myself to any particular construction of valve or to any particular arrangement of glass-holding frames, except in so far as I have definitely limited myself to particular constructions in the claims hereunto appended.

A particular advantage of my construction lies in the fact that any two or more glasses of each set can be simultaneously interposed in the light-ray and almost any blend or shade of color thus secured.

Having now described my invention, what I claim as new, and desire to secure by Letters Patent, is—

1. In a fountain adapted to throw jets of water and project thereon rays of light, the combination with a light-ray generator of a series of pivoted arms each carrying a plate of transparent material through a path which intersects that of the light-ray and does not interfere with or cross that of the other plates, and means for independently actuating said arms to project these plates into or withdraw them from the path of the light-ray.

2. In a fountain adapted to throw jets of water and project thereon rays of light, the combination with a light-ray generator of a series of pivoted arms each carrying a plate of transparent material through a path which intersects that of the light-ray and does not interfere with or cross that of the other plates, and each carrying a counterbalance, and means for independently actuating said arms to project these plates into or withdraw them from the path of the light-ray.

3. In a fountain adapted to throw jets of water and project thereon rays of light, the combination with a light-ray generator of a series of colored plates of glass or other transparent material arranged one above the other and each independently interposable in the path of the ray, a series of cylinders and pistons working therein, one piston connected to each plate and arranged to move it into and out of the path of the light-ray, a source of fluid-pressure, connections from said source to each cylinder and valves arranged to govern the admission and exhaust of the fluid-pressure to each cylinder.

4. In a fountain adapted to throw jets of water and project thereon rays of light, the combination of a light-ray generator of a series of colored plates of glass or other transparent material arranged one above the other and each independently interposable in the path of the ray, a series of cylinders and pistons working therein, one piston connected to each plate and arranged to move it into and out of the path of the light-ray, a source of fluid-pressure, connections from said source to each cylinder, valves arranged to govern the admission and exhaust of the fluid-pressure to each cylinder and electromagnets arranged to actuate said valves.

FREDERIC W. DARLINGTON.

Witnesses:
EDGAR W. LANK,
D. STEWART.